United States Patent
Dindi et al.

(10) Patent No.: US 7,097,786 B2
(45) Date of Patent: Aug. 29, 2006

(54) SUPPORTED RHODIUM-SPINEL CATALYSTS AND PROCESS FOR PRODUCING SYNTHESIS GAS

(75) Inventors: Hasan Dindi, Wilmington, DE (US); William Manogue, Newark, DE (US); Norman Herron, Newark, DE (US); Tianyan Niu, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 629 days.

(21) Appl. No.: 10/078,122

(22) Filed: Feb. 19, 2002

(65) Prior Publication Data

US 2002/0172642 A1 Nov. 21, 2002

Related U.S. Application Data

(60) Provisional application No. 60/269,417, filed on Feb. 16, 2001.

(51) Int. Cl.
| | |
|---|---|
| *C07C 1/02* | (2006.01) |
| *C01B 31/18* | (2006.01) |
| *C01B 3/02* | (2006.01) |
| *C01B 3/24* | (2006.01) |
| *B01J 23/46* | (2006.01) |

(52) U.S. Cl. .................. 252/373; 423/418.2; 423/648.1; 423/650; 423/651; 502/325

(58) Field of Classification Search ............ 423/418.2, 423/648.1, 650, 651; 502/325; 252/373
See application file for complete search history.

(56) References Cited

U.S. PATENT DOCUMENTS

| | | | |
|---|---|---|---|
| 4,088,608 A | 5/1978 | Tanaka et al. | |
| 4,274,981 A | 6/1981 | Suzuki et al. | |
| 4,690,777 A | 9/1987 | Valenyi | 252/373 |
| 4,877,550 A | 10/1989 | Goetsch | 252/373 |
| 5,025,109 A | 6/1991 | DeCaul | 585/500 |
| 5,105,044 A | 4/1992 | Han | 585/500 |
| 5,149,464 A | 9/1992 | Green | 252/373 |
| 5,238,898 A | 8/1993 | Han | 502/324 |
| 5,338,488 A | 8/1994 | Choudhary | 252/373 |
| 5,447,705 A | 9/1995 | Petit | 423/418 |
| 5,500,149 A | 3/1996 | Green | 252/373 |
| 5,510,056 A | 4/1996 | Jacobs | 252/373 |
| 5,614,163 A | 3/1997 | Bhattacharyya et al. | 423/418.2 |
| 5,648,582 A | 7/1997 | Schmidt | 585/652 |
| 5,653,774 A | 8/1997 | Bhattacharyya | 48/198 |
| 5,744,419 A | 4/1998 | Choudhary et al. | 502/326 |
| 6,284,217 B1 | 9/2001 | Wang | 423/651 |
| 6,409,940 B1 | 6/2002 | Gaffney et al. | 252/373 |

FOREIGN PATENT DOCUMENTS

| | | |
|---|---|---|
| EP | 303438 | 8/1988 |
| EP | 0640561 | 8/1994 |
| GB | 2247465 | 3/1992 |
| WO | WO94/14700 | 7/1994 |
| WO | WO 01/12540 | 2/2001 |

OTHER PUBLICATIONS

D.D. Beck, T.W. Capehart, C. Wong, and D.N. Belton, *XAFS Characterization of Rh/Al$_2$O$_3$ after Treatment in High–Temperature Oxidizing Environments*, Academic Press, Inc., J. Catal. (Apr. 1993) 144:311–324.

Ismunandar, Brendan J. Kennedy, and Brett A. Hunter, *Phase Transformation in CuRh$_2$O$_4$ : A Powder Neutron Diffraction Study*, Elsevier Science Ltd., Materials Research Bulletin (1999) 34(1):135–143.

K.S.R.C. Murthy and J. Ghose, *Electrical Studies on CuRh$_2$O$_4$*, Academic Press Inc., J. of Solid State Chemistry (Feb. 1987) 71:441–443.

H.C. Yao, S. Japar, and M. Shelef, , *Surface Interactions in the System Rh/Al$_2$O$_3$*, Academic Press, Inc., J. Catal. (Aug. 1977) 50:407–418.

Nalini Padmanaban, B.N. Avasthi, and J. Ghose, *Solid State Studies on Rhodium–Substituted CuCr$_2$O$_4$ Spinel Oxide*, Academic Press, Inc., J. of Solid State Chemistry (Jan. 1990) 86:286–292.

V. R. Choudhary, et al.; *Oxidative Conversion of Methane to Syngas over Nickel Supported on Commercial Low Surface Area Porous Catalyst Carriers Precoated with Alkaline and Rare Earth Oxides*; J Catal. 172: 281–293 (1997).

Patrick D.F. Vernon, et al.; *Partial Oxidation of Methane to Synthesis Gas*; Catalysis Letters 6 (1990) 181–186.

Jacob A. Moulijn, et al.; *Transformation of a Structured Carrier into Structured Catalyst*; Structured Catalysts and Reactors; Marcel Dekker, Inc.; p. 599–615; 1998.

PCT Search Report in PCT/US02/04813 dated Jul. 17, 2002.

*Primary Examiner*—Stanley Silverman
*Assistant Examiner*—Jonas Strickland
(74) *Attorney, Agent, or Firm*—Conley Rose P.C.

(57) ABSTRACT

Rhodium-spinel catalysts with activity for efficiently catalyzing the net partial oxidation of methane at high selectivities for CO and H$_2$ products are disclosed, along with their method of making. A syngas production process employing such catalysts for the net catalytic partial oxidation of a C$_1$–C$_5$ hydrocarbon (e.g., natural gas or methane) to a product gas mixture comprising CO and H$_2$ is also disclosed. Preferred reaction conditions include maintaining the catalyst at a temperature of about 400–1,200° C., super-atmospheric pressure, and flow rate sufficient to pass the reactant gas mixture over the catalyst at space velocities of at least about 100,000–25,000,000 hr$^{-1}$.

56 Claims, 1 Drawing Sheet

SUPPORTED RHODIUM-SPINEL CATALYSTS AND PROCESS FOR PRODUCING SYNTHESIS GAS

BACKGROUND OF THE INVENTION

1. Field of the Invention

The present invention generally relates to catalysts and processes for the catalytic partial oxidation of light hydrocarbons (e.g., methane or natural gas) using a supported rhodium-spinel catalyst to produce a mixture of carbon monoxide and hydrogen.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbons, for example, using the Fischer-Tropsch process to provide fuels that boil in the middle distillate range, such as kerosene and diesel fuel, and hydrocarbon waxes.

Current industrial use of methane as a chemical feedstock proceeds by the initial conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \rightleftharpoons CO + 3H_2 \quad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + 1/2 O_2 \rightarrow CO + 2H_2 \quad (2)$$

This ratio is more useful than the $H_2$:CO ratio from steam reforming for the downstream conversion of the syngas to chemicals such as methanol and to fuels. The partial oxidation is also exothermic, while the steam reforming reaction is strongly endothermic. Furthermore, oxidation reactions are typically much faster than reforming reactions. This allows the use of much smaller reactors for catalytic partial oxidation processes. The syngas in turn may be converted to hydrocarbon products, for example, fuels boiling in the middle distillate range, such as kerosene and diesel fuel, and hydrocarbon waxes by processes such as the Fischer-Tropsch synthesis.

The selectivities of catalytic partial oxidation to the desired products, carbon monoxide and hydrogen, are controlled by several factors, but one of the most important of these factors is the choice of catalyst composition. Difficulties have arisen in the prior art in making such a choice economical. Typically, catalyst compositions have included precious metals and/or rare earths. The large volumes of expensive catalysts needed by prior art catalytic partial oxidation processes have placed these processes generally outside the limits of economic justification.

For successful operation at commercial scale, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted in the art to the development of catalysts allowing commercial performance without coke formation.

An attempt at synthesis gas production by catalytic partial oxidation to overcome some of the disadvantages and costs typical of steam reforming is described in European Patent No. 303,438, entitled "Production of Methanol from Hydrocarbonaceous Feedstock." Certain high surface area monoliths of cordierite ($MgO/Al_2O_3/SiO_2$), Mn/MgO cordierite ($Mn—MgO/Al_2O_3/SiO_2$), mullite ($Al_2O_3/SiO_2$), mullite aluminum titanate ($Al_2O_3/SiO_2—(Al,Fe)_2O_3/TiO_2$), zirconia spinel ($ZrO_2/MgO/Al_2O_3$), spinel ($MgO/Al_2O_3$), alumina ($Al_2O_3$) and high nickel alloys are suggested as catalysts for the process. The monoliths may be coated with metals or metal oxides that have activity as oxidation catalysts, e.g., Pd, Pt, Rh, Ir, Os, Ru, Ni, Cr, Co, Ce, La, and mixtures thereof. Other suggested coating metals are noble metals and metals of groups IA, IIA, III, IV, VB, VIB, or VIIB of the periodic table of the elements.

A number of process regimes have been proposed for the production of syngas via catalyzed partial oxidation reactions. For example, the process described in U.S. Pat. No. 4,877,550 employs a syngas generation process using a fluidized reaction zone. Such a process however, requires downstream separation equipment to recover entrained supported-nickel catalyst particles. To overcome the relatively high pressure drop associated with gas flow through a fixed bed of catalyst particles, which can prevent operation at the high gas space velocities required, various structures for supporting the active catalyst in the reaction zone have been proposed. U.S. Pat. No. 5,510,056 discloses a monolithic support such as a ceramic foam or fixed catalyst bed having a specified tortuosity and number of interstitial pores that is said to allow operation at high gas space velocity. Catalysts used in that process include ruthenium, rhodium, palladium, osmium, iridium, and platinum. Data are presented for a ceramic foam supported rhodium catalyst at a rhodium loading of from 0.5–5.0 wt %.

U.S. Pat No. 5,648,582 also discloses a process for the catalytic partial oxidation of a feed gas mixture consisting essentially of methane. The methane-containing feed gas mixture and an oxygen-containing gas are passed over an alumina foam supported metal catalyst at space velocities of 120,000 hr.$^{-1}$ to 12,000,000 hr.$^{-1}$ The catalytic metals exemplified are rhodium and platinum, at a loading of about 10 wt %.

Certain catalysts containing Group VIII metals such as nickel or rhodium on a variety of supports have been described. For example, V. R. Choudhary et al. ("Oxidative Conversion of Methane to Syngas over Nickel Supported on Low Surface Area Catalyst Porous Carriers Precoated with Alkaline and Rare Earth Oxides," ((1997) *J. Catal.*, 172: 281–293) disclose the partial oxidation of methane to syngas at contact times of 4.8 ms (at STP) over supported nickel catalysts at 700 and 800° C. The catalysts were prepared by depositing NiO—MgO on different commercial low surface area porous catalyst carriers consisting of refractory compounds such as $SiO_2$, $Al_2O_3$, SiC, $ZrO_2$ and $HfO_2$. The catalysts were also prepared by depositing NiO on the catalyst carriers with different alkaline and rare earth oxides such as MgO, CaO, SrO, BaO, $Sm_2O_3$ and $Yb_2O_3$.

U.S. Pat. No. 4,690,777 also discloses catalysts comprising Group VIII metals, such as Ni, on porous supports, for use in reforming hydrocarbons to produce CO and $H_2$. U.S. Pat. No. 5,500,149 discloses various transition metals that can act as catalysts in the reaction $CO_2+CH_4 \rightarrow 2CO+2H_2$, and demonstrates how reaction conditions can affect the product yield.

U.S. Pat. No. 5,149,464 discloses a method for selectively converting methane to syngas at 650° C. to 950° C. by contacting the methane/oxygen mixture with a solid catalyst comprising a supported d-Block transition metal, transition metal oxide, or a compound of the formula $M_xM'_yO_z$ wherein M' is a d-Block transition metal and M is Mg, B, Al, Ga, Si, Ti, Zr, Hf or a lanthanide.

The partial oxidation of methane to synthesis gas using various transition metal catalysts under a range of conditions has been described by Vernon, D. F. et al. ((1990) *Catalysis Letters* 6:181–186). European Pat. App. Pub. No. 640561 discloses a catalyst for the catalytic partial oxidation of hydrocarbons comprising a Group VIII metal on a refractory oxide having at least two cations.

U.S. Pat. No. 5,447,705 discloses an oxidation catalyst having a perovskite crystalline structure and the general composition: $Ln_xA_{1-y}B_yO_3$, wherein Ln is a lanthanide and A and B are different metals chosen from Group IVb, Vb, VIb, VIIb or VIII of the Periodic Table of the Elements. The catalyst is said to have activity for the partial oxidation of methane.

U.S. Pat. No. 5,105,044 discloses a process for synthesizing hydrocarbons having at least two carbon atoms by contacting a mixture of methane and oxygen with a spinel oxide catalyst of the formula $AB_2O_4$, where A is Li, Mg, Na, Ca, V, Mo, Mn, Fe, Co, Ni, Cu, Zn, Ge, Cd or Sn and B is Na, Al, Ti, V, Cr, Mn, Fe, Co, Ni, Zn, Ga, Ge, Rh, Ag or In, A and B being different elements.

U.S. Pat. No. 5,653,774 discloses a spinel catalyst of the formula $M^{2+}M_2^{3+}O_4$ where $M^{2+}$ is at least one member of a group consisting of $Mg^{2+}$, $Zn^{2+}$, $Ni^{2+}$, $Fe^{2+}$, $Cu^{2+}$, $Co^{2+}$, $Mn^{2+}$, $Pd^{2+}$ and $Pt^{2+}$, and $M^{3+}$ is at least one member of a group consisting of $Al^{3+}$, $B^{3+}$, $Cr^{3+}$, $Fe^{3+}$, $Ga^{3+}$, $In^{3+}$, $La^{3+}$, $Ni^{3+}$, $Co^{3+}$, $Mn^{3+}$, $Rh^{3+}$, $Ti^{3+}$ and $V^{3+}$ ions, for the preparation of synthesis gas from a hydrocarbyl compound. The catalyst is prepared by heating hydrotalcite-like compositions having the general formula $[M^{2+}_{(1-x)}M_x^{3+}(OH_2)]^{x+}(A_{x/n}{}^{n-1}) \cdot mH_2O$.

U.S. Pat. No. 5,338,488 describes a process for the catalytic steam reforming of methane or natural gas to synthesis gas. The catalyst employed in that process is NiO supported on calcium aluminate, alumina, spinel type magnesium aluminum oxide or calcium aluminate titanate) and the reaction conditions include elevated temperature (850°–1,000° C.) and pressure (10–40 atm), a gas hourly space velocity of about 5000–8000 per hour at a steam/carbon mole ratio of 2–5.

U.S. Pat. No. 5,025,109 describes spinel oxide catalysts such as $ZnMn_2O_4$ that are active for catalyzing the direct partial oxidation of methane with oxygen to produce hydrocarbons having at least two carbon atoms. U.S. Pat. No. 5,238,898 describes a process for upgrading methane to higher hydrocarbons using spinel oxide catalysts such as $MgMn_2O_4$ or $CaMn_2O_4$, modified with an alkali metal such as Li or Na.

British Pat. No. GB2247465 describes certain catalysts comprising platinum group metals supported on inorganic compounds such as oxides and/or spinels of aluminum, magnesium, zirconium, silicon, cerium and/or lanthanum, and combinations thereof, together with an alkaline metal in some cases. These catalysts are said to be active for producing synthesis gas from methane by means of reforming and combustion reactions, optionally in the presence of steam.

PCT Patent Application Publication No. WO 01/12540 describes steam reforming of a hydrocarbon over certain spinel-supported rhodium catalysts. Suitable hydrocarbon feeds for that process are said to be oxygenates, alkanes, alkenes, alkynes, branched isomers, aromatics, saturated and unsaturated hydrocarbons and combinations thereof, including fuels such as gasoline, kerosene, diesel and JP-8.

One disadvantage of many of the existing catalytic hydrocarbon conversion methods is the need to include steam in the feed mixture to suppress coke formation on the catalyst. Another drawback of some of the existing processes is that the catalysts that are employed often result in the production of significant quantities of carbon dioxide, steam, and $C_2+$ hydrocarbons. Also, large volumes of catalyst are sometimes required, necessitating the use of exceptional devices in an attempt to evenly distribute the feed to the top of the catalyst bed. None of the existing processes or catalysts are capable of providing high conversion of reactant gas and high selectivity of CO and $H_2$ reaction products. Accordingly, there is a continuing need for a process and catalyst for the catalytic partial oxidation of hydrocarbons, particularly methane, or methane containing feeds, in which the catalyst retains a higher level of activity and selectivity to carbon monoxide and hydrogen under conditions of high gas space velocity, elevated pressure and high temperature.

SUMMARY OF THE INVENTION

The present invention provides rhodium-containing mixed oxide catalysts that are highly active for catalyzing the partial oxidation of methane to synthesis gas at very high selectivities for $H_2$ and CO products. Also provided are methods of making the new catalysts. The present invention also provides a process for preparing synthesis gas using these catalysts for the net catalytic partial oxidation of light hydrocarbons having a low boiling point (e.g. $C_1$–$C_5$ hydrocarbons, especially methane, or methane containing feeds such as natural gas). One advantage of the new process is that the new Rh-containing catalysts retain a high level of activity and selectivity to carbon monoxide and hydrogen under conditions of high gas space velocity, elevated pressure and relatively high temperature. The new processes of the invention are particularly useful for converting gas from naturally occurring reserves of methane which contain carbon dioxide. Another advantage of the new catalysts and processes is that they are economically feasible for use in commercial-scale conditions.

In accordance with one aspect of the invention catalysts are provided that are active in catalyzing the partial oxidation of a hydrocarbon to produce synthesis gas. In some embodiments, the catalyst contains from about 0.1 to about 10 weight % Rh and is selected from the group of mixed metal oxide spinels that have the general formula $MRh_2O_4$, in which M is one or more metals chosen from the group: Co, Mg, Al, B, V, La, Li, Ti, Ca, Cu, Zn, Cd, Mn, Ga, Ni, Fe, Ag, Mo, Na, Pt and Cr. Some preferred Rh-containing spinels are $MgRhAlO_4$, $CoRhAlO_4$, $MgRh_2O_4$, $CoRhAl_2O_4$, $CoRh_2O_4$, $LiTiRhO_4$, $CaRh_2O_4$, $CuRh_2O_4$, $ZnRh_2O_4$, $CdRh_2O_4$. A. F. Wells describes spinel crystal structures in "Structural Inorganic Chemistry," Claredon Press, Oxford, 1975, p. 489.

In some alternative embodiments the catalysts comprise about 0.1 to about 10 weight % Rh deposited on a spinel such as $CoAl_2O_4$, $MgAl_2O_4$ or $NiAl_2O_4$. Some embodiments of the catalyst of the invention include a refractory support, or carrier, for the active catalyst material such as a monolith comprising zirconia, magnesium stabilized zirconia, alpha-alumina, cordierite (15% MgO, 35% $Al_2O_3$, 50% $SiO_2$), zirconia-tetra-alumina (ZTA, 20% $ZrO_2$, 80% $Al_2O_3$), oxide-bonded silicon carbide (OBSiC, 50% SiC, 40% $Al_2O_3$, 10% $SiO_2$), mullite (63% $Al_2O_3$, 37% $SiO_2$), lithium aluminum silicate (LAS, 4% $LiO_2$, 29% $Al_2O_3$, 67% $SiO_2$), sialon (silicon aluminum oxynitride), titanates such as $SrTiO_3$, fused silica, magnesia, yttrium aluminum garnet (YAG), and boron nitride.

In some embodiments the Rh-containing mixed oxides, with or without additional ceramic material, are formed as a 3-dimensional structure, such as a foam monolith, for use as a catalyst for syngas production.

Methods of making the above-described catalysts are also provided by the present invention. In one embodiment, the method includes preparing an aqueous solution of at least one oxidizable metal salt, the metal component of which is Co, Al, Li, Ti, Ni, Mn, Cd, Zn, Cu, Mg, Ca, Fe, Mo or La. Next, a porous monolith is impregnated with the solution in such a way that the monolith becomes coated with the mixed metal salts. This coated monolith is then calcined in an oxidizing atmosphere while heating the monolith, so that the mixed metal salts are converted to a spinel phase. The spinel structure is preferably confirmed by X-ray diffraction analysis. The mixed spinel-coated monolith is then impregnated with a catalytically active amount of an oxidizable rhodium salt, to yield a rhodium salt impregnated spinel-coated monolith. The method also includes calcining the rhodium-salt-impregnated-spinel-coated monolith in an oxidizing atmosphere, to yield a rhodium/spinal coated monolith. Additionally, the rhodium/spinel coated monolith may be flushed with an inert gas; and, optionally, calcined in a reducing atmosphere prior to being used in a short contact time reactor for catalyzing the production of synthesis gas. The resulting catalyst is characterized by its ability to serve as a syngas catalyst, particularly in a "short" contact time reactor for synthesis gas production at operating conditions comprising a catalyst temperature of about 400–1,200° C., reactant gas pressure of about 100–32,000 kPa, and reactant gas hourly space velocity of about 20,000 to 100,000,000 $hr^{-1}$ such that methane and oxygen are oxidatively converted at about 90–100% efficiency to a product gas comprising $H_2$ and CO in a molar ratio at or near the ideal Fischer-Tropsch feed ratio of about 2:1. Preferably the operating conditions are manipulated or controlled such that selectivities for CO and $H_2$ products of at least about 80% are obtained, and more preferably at least about 90%.

According to another embodiment, the method of making a catalyst may instead include preparing an aqueous solution containing a Rh salt and at least one other metal salt, the metal component of which is, preferably, Co, Al, Li, Ti, Ni, Mn, Cd, Zn, Cu, Mg, Ca, Fe, Mo or La. A porous refractory monolith is impregnated with the solution, to form a mixed metal salt coated monolith. The method further includes calcining the metal salt coated monolith such that the mixed metal salts are converted to a spinel phase, to yield a mixed oxide-coated monolith comprising about 0.1–10 wt % Rh. The method also includes reducing the mixed oxide-coated monolith to yield the final monolith catalyst, which may be flushed with an inert gas prior to use for catalyzing the production of synthesis gas.

Still another embodiment of the method of making a highly active syngas catalyst includes combining an oxidizable Rh salt and at least one other oxidizable metal salt, the metal component of which is Co, Ni, Mn, Cd, Zn, Cu, Mg, Ca, Fe, Mo or La. In some embodiments a powdered ceramic material is also combined with the metal salts. The ceramic material may be zirconia, magnesium stabilized zirconia, alpha-alumina, cordierite, zirconia-toughened alumina oxide-bonded silicon carbide, mullite, lithium aluminum silicate, sialon, titanates, fused silica, magnesia, yttrium aluminum garnet, or boron nitride, for example. The salts, and, optionally, the ceramic material, are combined with a suitable solvent, such that a mixture is formed. The mixture might be in the form of a thick slurry or a paste. This mixture is then formed into the desired three-dimensional structure, such as a foam or pellet, powder or granule. After evaporation of the solvent a tortuous-path monolith catalyst is obtained.

Still another aspect of the present invention provides a method for producing synthesis gas by the catalytic partial oxidization of a 1–5 carbon-containing hydrocarbon to form a product gas mixture comprising CO and $H_2$. In preferred embodiments the method includes contacting a reactant gas mixture comprising the hydrocarbon and a source of oxygen ($O_2$) with a catalytically effective amount of a Rh-mixed metal oxide containing catalyst having a composition as described above. The method includes maintaining the catalyst and the reactant gas mixture at conversion promoting conditions (e.g., favorable temperatures, reactant gas composition, pressure, space velocity and contact time) during contacting of the reactant gas mixture with the catalyst. Certain embodiments of the method for partially oxidizing hydrocarbons comprise preheating the reactant gas mixture, preferably in the range of 30° C.–750° C. Some embodiments of the method comprise passing the reactant gas mixture over the catalyst at a gas hourly space velocity (GHSV) of about 20,000–100,000,000 $hr^{-1}$, preferably at a GHSV in the range of 100,000–25,000,000 $hr^{-1}$. In preferred embodiments the reactant gas mixture/catalyst contact time is no more than about 200 milliseconds, preferably 20–50 milliseconds or less, more preferably ≦10 milliseconds. In some embodiments the process includes maintaining the catalyst at a temperature of about 400° C.–1,200° C. during contact with the gas mixture. In some embodiments of the process the reactant gas mixture and the catalyst are maintained at superatmospheric pressure during the contacting, and in some of the more preferred embodiments the pressure is in the range of 200–32,000 kPa.

Certain embodiments of the syngas production method comprise mixing a methane-containing feedstock and an oxygen-containing feedstock to provide a reactant gas mixture feedstock having a carbon:oxygen ratio of about 1.5:1 to about 3.3:1, preferably 1.7:1 to 2.1:1, more preferably 2:1.

In some embodiments the said oxygen-containing gas that is mixed with the hydrocarbon comprises steam or $CO_2$, or a mixture of both. In some embodiments the $C_1$–$C_5$ hydrocarbon comprises at least about 80% methane by volume. These and other embodiments, features and advantages of the present invention will become apparent with reference to the following description and drawing.

BRIEF DESCRIPTION OF THE DRAWING

For a more detailed description of the present invention, reference will now be made to the accompanying Figure, wherein.

DETAILED DESCRIPTION OF PREFERRED EMBODIMENTS

Figure 1:
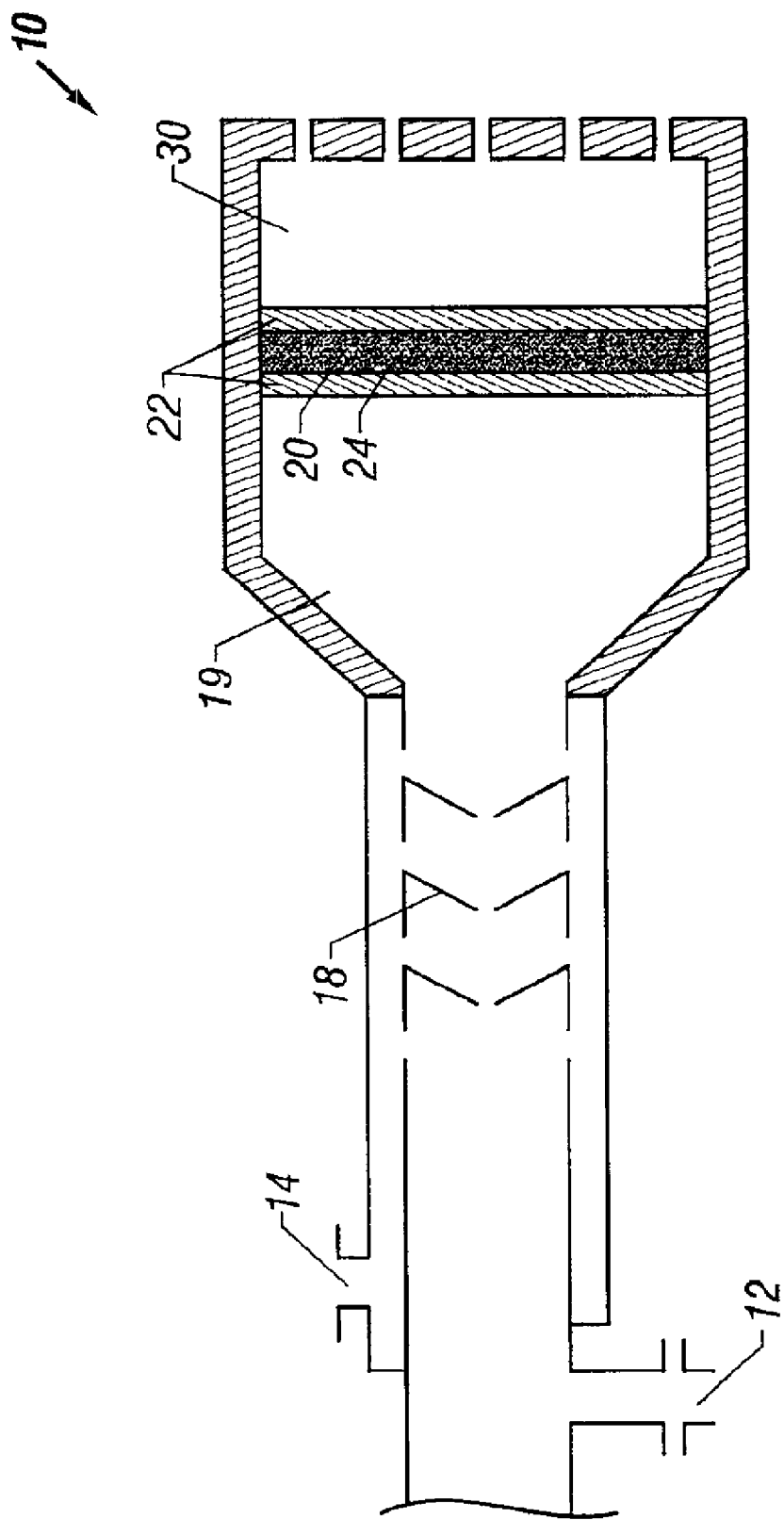
FIG. 1 is an enlarged cross-sectional view of a short contact time reactor employed in certain embodiments of the invention for the production of synthesis gas.

The term "catalytic partial oxidation" or CPOX when used in the context of the present syngas production methods, in addition to its usual meaning, can also refer to a net partial oxidation process, in which one or more light hydrocarbons (e.g., methane) and oxygen are supplied as reactants and the resulting product stream is predominantly the partial oxidation products CO and $H_2$, rather than the complete oxidation products $CO_2$ and $H_2O$. For example, employing a methane feed, the preferred catalysts serve in a short contact time process, which is described in more detail below, to yield a product gas mixture containing $H_2$ and CO in a molar ratio of approximately 2:1. In the course of syngas generation under process conditions that favor the CPOX reaction ("net catalytic partial oxidation promoting conditions"), which are as described in more detail elsewhere herein, intermediates such as $CO_2$+$H_2O$ may occur to a minor extent as a result of the oxidation of a small portion of the methane feed, followed by a reforming step, to produce CO and $H_2$. Also, some slight amount of steam reforming (Reaction 1) may occur, and, particularly in the presence of carbon dioxide-containing hydrocarbon feedstock or $CO_2$ intermediate, the dry reforming reaction (Reaction 3) (using methane as the exemplary hydrocarbon),

$$CH_4+CO_2 \rightarrow 2CO+2H_2 \qquad (3)$$

and/or the water-gas shift (Reaction 4) may occur incidental to the primarily CPOX reaction to produce syngas.

$$CO+H_2O \leftrightharpoons CO_2+H_2 \qquad (4)$$

The relative amounts of the CO and $H_2$ in the reaction product mixture resulting from the net CPOX of methane and oxygen are preferably about 2:1 $H_2$:CO, i.e., the stoichiometric product ratios in Reaction (2). As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

New Rh-based catalysts comprise about 0.1 wt % to about 10 wt % rhodium, preferably carried on supports of magnesium stabilized zirconia, zirconia stabilized alumina, yttrium stabilized zirconia, calcium stabilized zirconia, alumina, cordierite or $ZrO_2$. In these catalysts, the Rh may be incorporated into the structure of a spinel. Alternatively, rhodium may be deposited on a spinel, which is then deposited on a support or formed into a monolith. Some especially desirable catalysts include: $CoRh_2O_4$ spinel on a partially stabilized (with MgO) zirconia monolith (PSZ monolith), $CoRhAlO_4$ spinel on a PSZ monolith, $MgRh_2O_4$ spinel on α-alumina, $CoRhAlO_4$ spinel on PSZ monolith, $CoAl_2O_4$ spinel on PSZ monolith. Other active syngas catalysts comprise Rh deposited on $NiAl_2O_4$ spinel and supported by an α-alumina support, and Rh deposited on $CoAl_2O_4$ spinel on an α-alumina support. As shown in the data presented below, representative new Rh-containing catalysts are highly active for converting methane to CO and $H_2$ products, and demonstrate selectivities for CO and $H_2$ up to 100%. Moreover, the molar ratio of $H_2$:CO products is about 2:1, in many cases, and with other of the new catalysts the molar ratio of the products is about 1.9:1 to about 2.3:1, indicative of a predominantly or net catalytic partial oxidation reaction taking place at the very high space velocities of the preferred syngas production process. Other desirable Rh-containing catalyst compositions include $NiRh_2O_4$ and $MnRh_2O_4$ spinels. Active Rh catalysts are prepared as described in the following examples and utilizing techniques known to those skilled in the art, such as impregnation, wash coating, adsorption, ion exchange, precipitation, co-precipitation, deposition precipitation, sol-gel method, slurry dip-coating, microwave heating, and the like, or any of the other methods known in the art. Preferred techniques are impregnation and wash coating. For example, a Rh based catalyst is prepared by impregnation of a ceramic monolith of a refractory oxide with rhodium deposited on a $CoAl_2O_4$ spinel.

Alternatively, the catalyst components, with or without a ceramic support composition, may be extruded to prepare a three-dimensional form or structure such as a honeycomb, foam, other suitable tortuous-path structure or pellet, powder, or granule. Additionally the catalyst components may be added to the powdered ceramic composition and then extruded to prepare the foam or honeycomb. Preferred foams for use in the preparation of the catalyst include those having from 30 to 150 pores per inch (12 to 60 pores per centimeter), more preferably 80 pores per inch. Alternative forms for the catalyst include refractory oxide honeycomb monolith structures, or other configurations having longitudinal channels or passageways permitting high space velocities with a minimal pressure drop. Such configurations are known in the art and described in the literature. See, for example, X. Xu and J. A. Moulijn, "Transformation of a Structured Carrier into Structured Catalyst" *Structured Catalysts and Reactors*, A. Cybulski and J. A. Moulijn (Eds.), Marcel Dekker, Inc., 1998, p. 599–615 (Ch. 21). The term "monolith" as used herein includes any singular piece of material of continuous manufacture such as solid pieces of metal oxide, foam materials or honeycomb structures.

Still other satisfactory supported catalysts are formed as discrete or divided units or structures such as granules, beads, rods, pills, pellets, tablets, cylinders, trilobes, extrudates, spheres or other rounded shapes, or another manufactured configuration. Alternatively, the divided material may be in the form of irregularly shaped particles. Preferably at least a majority (i.e., >50%) of the units have a maximum characteristic length (i.e., longest dimension) of less than ten millimeters, preferably ≦six millimeters, and more preferably ≦three millimeters. Spherical particles are especially preferred for a packed bed syngas production process.

The divided catalyst may, instead, be formed by depositing the catalytic material on divided supports configured as described above. These catalysts may be prepared using techniques that are known in the art for depositing active catalyst materials onto refractory supports, and which have been well described in the literature. Such techniques may include impregnation, wash coating, adsorption, ion exchange, precipitation, co-precipitation, deposition precipitation, sol-gel method, slurry dip-coating, microwave heating, and the like. A preferred technique is the incipient wetness method. A general reference that describes various catalyst forms and conventional techniques used for making catalysts is CATALYST MANUFACTURE, $2^{nd}$ edition, by Alvin B. Stiles and Theodore A. Koch, Marcel Dekker, Inc., NY, 1995.

Any suitable reaction regime may be applied in order to contact the reactants with the catalyst. One suitable regime is a fixed bed reaction regime, in which the catalyst is retained within a reaction zone in a fixed arrangement. The monolith catalyst or packed bed of divided catalyst preferably has sufficient porosity, or sufficiently low resistance to gas flow, to permit a stream of gaseous hydrocarbon to pass over the catalyst at high gas hourly space velocities, preferably at least 100,000 $hr^{-1}$, more preferably up to 50,000,000–100,000,000 $hr^{-1}$ when the catalyst is employed in a syngas production reactor. Preferably the catalyst support or the formed catalyst is mechanically stable at gas pressures greater than 2 atmospheres, which is advantageous for optimizing syngas production space-time yields.

EXAMPLES

Representative Rh-containing catalysts were prepared as described in the following Examples and were evaluated for their ability to catalyze the partial oxidation of methane to synthesis gas employing a laboratory-scale short contact time reactor using the following test procedure.

Test Procedure

The catalytic partial oxidation reactions were conducted with a conventional flow apparatus using a 19 mm O.D.×13 mm I.D. quartz reactor with the rhodium-containing catalyst supported on a monolith (12 mm O.D.) held between two 5 mm×12 mm alpha-alumina foam disks. The supported catalyst and the disks were wrapped with an alumina cloth to obtain a single cylinder of 13 mm diameter and about 15 mm height. Two band heaters were fitted around the quartz reactor. The band heaters were used to supply thermal energy to light off the reaction and to preheat the feed gases. After light off, the band heaters were turned off and the reaction proceeded autothermally. Two Type S thermocouples, one at each end of the catalyst bed, were used to monitor the reaction temperature.

The methane-containing and $O_2$-containing gases were mixed at room temperature and the mixed gas was fed to the reactor with or without preheating. The product gas mixture was analyzed for $CH_4$, $O_2$, CO, $H_2$, $CO_2$ and $N_2$ using a gas chromatograph equipped with a thermal conductivity detector.

GHSV is gas hourly space velocity, i.e., liters of gas (measured at atmospheric pressure and 23° C.) fed per hour per liter of catalyst. The GHSV is generally calculated as follows:

$$GHSV = F_{tot}/V_{cat}$$

where $F_{tot}$ is the total reactant volumetric flowrate at standard conditions in cm$^3$/sec, and $V_{cat}$ is the volume of the catalyst reaction zone in cm$^3$. For example, the volume of the catalyst reaction zone is simply the volume of the cylinder (e.g., 12 mm in diameter×10 mm in length, or 1.2 cm$^3$). Thus, at a flowrate of 1,389 cm$^3$/min, the GHSV is calculated as follows:

$$GHSV(hr^{-1}) = (1389 \text{ cm}^3/\text{min})/(1.2 \text{ cm}^3) \times (60 \text{ min/hr}) = 100{,}000 \text{ hr}^{-1}.$$

Although, for ease in comparing with other syngas production systems, space velocities at standard conditions have been used in the present studies, it is well recognized in the art that residence time is the inverse of space velocity and that the disclosure of high space velocities equates to low residence times on the catalyst. At GHSVs of 100,000 hr$^{-1}$ or more the residence or contact time of the reactant gas mixture on the catalyst is very short (i.e., preferably less than about 10 milliseconds). In tests of representative catalyst compositions (described below) in the reduced-scale short contact time reactor, gas hourly space velocities (GHSV) of at least about 260,000 to about 2,273,000 hr$^{-1}$ were obtained at the specified pressures.

EXAMPLES

Example 1

5.11% Rh/CoAl$_2$O$_4$ Spinel on Alpha-Alumina

Cobalt nitrate hydrate (1.45 g) and aluminum nitrate hydrate (3.75 g) were dissolved into distilled water (10 mL) to make a solution comprising 5 mmoles of Co, 10 mmoles Al, and 37 mmoles of Rh. Part of the resulting solution (1.438 mL) was evaporated at room temperature and normal atmospheric pressure (i.e., 100 kPa) in the presence of an alpha-alumina monolith (10×12 mm; 80 pores per inch (ppi)) weighing 1.438 g. The alumina deposited nitrates were then calcined at 800° C. in pure oxygen for 4 hours to decompose to the spinel oxide phase as confirmed by powder x-ray diffraction (XRD) analysis and yield a spinel loading of 5.58 wt %. The recovered monolith was then impregnated with a solution of rhodium chloride hydrate (0.220 g) dissolved in a minimum volume of acetone. The acetone was evaporated at room temperature and pressure. The monolith was re-calcined in flowing oxygen at 600° C. for 1 hour. After flushing well with nitrogen the monolith was then further calcined at 400° C. in flowing 9:1 helium-:hydrogen for 4 hours. The final weight of the monolith was 1.605 g for a Rh loading of 5.1 wt %. The activity of this catalyst monolith, comprising Rh deposited on CoAl$_2$O$_4$ spinel on alpha-alumina monolith, was tested for syngas production (26 hr and 46 hr runs) according to the Test Procedure described above. The results are shown in Table 1 and summarized in Table 16. "Pre-H" indicates the reactant gas preheat temperature, "Cat-B" indicates the temperature at the bottom of the catalyst bed.

TABLE 1

| Pressure | | Temp (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 1.9 | 114 | 499 | 785 | 266,000 | 2.01 | 93 | 100 | 102 | 2.04 |
| 1.8 | 114 | 504 | 814 | 269,000 | 1.92 | 97 | 99 | 102 | 2.05 |
| 1.7 | 113 | 507 | 876 | 274,000 | 1.83 | 100 | 99 | 101 | 2.03 |
| 4.7 | 134 | 496 | 850 | 531,000 | 1.98 | 97 | 101 | 101 | 2.01 |
| 5.0 | 136 | 498 | 919 | 540,000 | 1.88 | 100 | 100 | 100 | 2.00 |
| 5.1 | 136 | 501 | 1024 | 547,000 | 1.78 | 100 | 101 | 100 | 1.97 |
| 15.0 | 205 | 506 | 871 | 531,000 | 1.97 | 100 | 97 | 98 | 2.03 |
| 5.2* | 137* | 507* | 969* | 540,000* | 1.90* | 100* | 98* | 105* | 2.14* |

*Average performance over 13 hrs after 30 additional synthesis hours in a second run with the same sample in the same equipment.

Example 2

4.85% Rh/NiAl$_2$O$_4$ Spinel on Alpha-Alumina

Nickel nitrate hydrate (1.45 g) and aluminum nitrate hydrate (3.75 g) were dissolved in distilled water (10 mL). Part of the resulting solution (1.271 mL) was evaporated at room temperature and pressure in the presence of an alpha-alumina monolith (10×12 mm; 80 ppi) weighing 1.271 g. The alumina deposited nitrates were then calcined at 800° C. in pure oxygen for 4 hours to decompose to the spinel oxide phase as confirmed by powder XRD and yield a spinel loading of 4.79 wt. %. The recovered monolith was then impregnated with a solution of rhodium chloride hydrate (0.164 g) dissolved in a minimum volume of acetone. The acetone was evaporated at room temperature and pressure. The monolith was re-calcined in flowing oxygen at 600° C. for 1 hour. After flushing well with nitrogen the monolith was then further calcined at 400° C. in flowing 9:1 helium-:hydrogen for 4 hours. The final weight of the impregnated monolith was 1.403 g with a Rh loading of 4.85 wt %. Results for a 12 hr synthesis using this catalyst for syngas production are shown in Table 2, and summarized in Table 16.

TABLE 2

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 1.5 | 112 | 498 | 818 | 531,000 | 1.98 | 94 | 97 | 105 | 2.14 |
| 1.5 | 112 | 498 | 845 | 540,000 | 1.89 | 99 | 97 | 104 | 2.13 |
| 1.4 | 111 | 500 | 915 | 549,000 | 1.79 | 100 | 97 | 102 | 2.10 |
| 4.2 | 130 | 501 | 1141 | 1,062,000 | 1.94 | 90 | 97 | 101 | 2.08 |
| 4.4 | 132 | 502 | 1268 | 1,079,000 | 1.85 | 91 | 97 | 100 | 2.06 |

Example 3

5.3% Rh/CoAl$_2$O$_4$ on PSZ

Cobalt nitrate hydrate (1.45 g; 5 millimoles) and aluminum nitrate hydrate (3.75 g; 10 millimoles) were dissolved in distilled water (10 mL). Part of the resulting solution (0.924 mL) was evaporated at room temperature and pressure in the presence of a partially stabilized (MgO) zirconia (PSZ) monolith (10×12 mm; 80 ppi) weighing 0.924 g (commercially available from Vesuvius Hi-Tech Ceramics Inc., Alfred Station, N.Y.). The alumina deposited nitrates were then calcined at 800° C. in pure oxygen for 4 hours to decompose to the spinel oxide phase as confirmed by powder XRD and yield a spinel loading of 4.04 wt. %. The recovered monolith was then impregnated with a solution of rhodium chloride hydrate (0.12 g; 0.37 millimoles) dissolved in a minimum volume of acetone. The acetone was evaporated at room temperature and pressure. The monolith was re-calcined in flowing oxygen at 600° C. for 1 hour. After flushing well with nitrogen the monolith was then further calcined at 400° C. in flowing 9:1 helium:hydrogen for 4 hours. The final weight of the monolith was 1.017 g for a Rh loading of 5.3 wt %. Results using this Rh deposited on CoAl$_2$O$_4$ spinel on PSZ monolith for syngas production are shown in Table 3, and summarized in Table 16.

Example 4

11.73% CoRhAlO$_4$ Spinel on PSZ

A small 80 ppi PSZ monolith was weighed (0.85 g) and then immersed into a solution (4 mL) containing cobalt nitrate (116 mg), rhodium nitrate (132 mg) and aluminum nitrate (152 mg) in a Teflon® (poly(tetrafluoroethylene)) beaker. The solvent water was slowly evaporated, thereby, coating the monolith with the mixed nitrates. The impregnated monolith was then calcined in flowing air for 4 hours at 600° C. which converted the nitrate mixture to the spinel phase as detected by powder XRD. The monolith was re-weighed (0.978 g) to calculate the spinel loading of 13.1 wt %, for a final Rh loading of 11.73%. The monolith was then reduced in a flow of 9:1 He:H$_2$ at 400° C. for 30 minutes, then cooled, flushed with helium. Results using this CoRhAlO$_4$ spinel on PSZ monolith for syngas production are shown in Tables 4A–C, and summarized in Table 16.

TABLE 3

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 1.4 | 111 | 476 | 830 | 266,000 | 2.01 | 95 | 98 | 107 | 2.18 |
| 1.5 | 112 | 503 | 885 | 270,000 | 1.91 | 100 | 98 | 106 | 2.16 |
| 1.4 | 111 | 509 | 1002 | 275,000 | 1.82 | 100 | 97 | 104 | 2.14 |
| 4.0 | 129 | 501 | 899 | 531,000 | 1.98 | 99 | 98 | 104 | 2.11 |
| 4.3 | 131 | 505 | 986 | 540,000 | 1.88 | 100 | 98 | 103 | 2.10 |
| 4.5 | 132 | 509 | 1110 | 549,000 | 1.78 | 100 | 98 | 101 | 2.07 |
| 1.4 | 111 | 494 | 891 | 270,000 | 1.92 | 100 | 98 | 107 | 2.19 |
| 1.4 | 111 | 500 | 856 | 265,000 | 2.00 | 95 | 98 | 107 | 2.19 |
| 14.6 | 202 | 503 | 924 | 531,000 | 1.97 | 98 | 98 | 104 | 2.13 |

TABLE 4A

| | | | | 25 hr Run Time | | | | |
|---|---|---|---|---|---|---|---|---|
| Pressure | | Temp. (° C.) | | GHSV | | % CH$_4$ | % CO | % H$_2$ |
| (psig) | (kPa) | Pre-H | Cat-B | (hr.$^{-1}$) | CH$_4$:O$_2$ | Conv. | Sel. | Sel. | H$_2$:CO |
| 2.0 | 115 | 507 | 830 | 266,000 | 2.00 | 94 | 99 | 102 | 2.06 |
| 2.0 | 115 | 511 | 884 | 270,000 | 1.96 | 100 | 98 | 102 | 2.06 |
| 2.0 | 115 | 517 | 990 | 275,000 | 1.86 | 100 | 100 | 101 | 2.02 |
| 4.0 | 129 | 498 | 873 | 530,000 | 2.11 | 98 | 100 | 99 | 1.99 |
| 4.0 | 129 | 502 | 959 | 539,000 | 2.05 | 100 | 99 | 98 | 1.97 |

Results using this same CoRhAlO$_4$ spinel on PSZ monolith for different length syngas production runs are shown in Tables 4B (20 hrs) and Table 4C (375 hrs). Table 4B shows 3 hour data after 17 hr at 530,000 hr$^{-1}$. Table 4C shows life study results after 370 hr.

TABLE 4B

| | | | | 20 Hrs Run Time | | | | |
|---|---|---|---|---|---|---|---|---|
| Pressure | | Temp. (° C.) | | GHSV | | % CH$_4$ | % CO | % H$_2$ |
| (psig) | (kPa) | Pre-H | Cat-B | (hr.$^{-1}$) | CH$_4$:O$_2$ | Conv. | Sel. | Sel. | H$_2$:CO |
| 4.3 | 131 | 496 | 879 | 531,000 | 2.25 | 90 | 100 | 100 | 2.00 |
| 4.3 | 131 | 499 | 967 | 539,000 | 2.27 | 92 | 99 | 100 | 1.97 |
| 4.3 | 131 | 503 | 1097 | 559,000 | 2.25 | 90 | 100 | 100 | 2.00 |

TABLE 4C

| | | | | 370 Hrs Run Time | | | | |
|---|---|---|---|---|---|---|---|---|
| Pressure | | Temp. (° C.) | | GHSV | | % CH$_4$ | % CO | % H$_2$ |
| (psig) | (kPa) | Pre-H | Cat-B | (hr.$^{-1}$) | CH$_4$:O$_2$ | Conv. | Sel. | Sel. | H$_2$:CO |
| 7.0 | 149 | 355 | 998 | | 1.91 | 89 | 98 | 97 | 1.96 |
| 7.6 | 154 | 357 | 1097 | | 1.76 | 96 | 96 | 94 | 1.94 |
| 5.0 | 136 | 407 | 1067 | | 1.80 | 94 | 97 | 95 | 1.97 |

Example 5

6.9% MgRh$_2$O$_4$ Spinel on Alpha-Alumina

Rhodium nitrate hydrate (260 mg) and magnesium nitrate hydrate (100 mg) were dissolved in distilled water (4 mL). The resulting solution was evaporated at room temperature and pressure in the presence of two alumina monoliths (each 5×10 mm; 80 ppi) weighing 1.136 g. The alumina deposited nitrates were then calcined at 600° C. in pure oxygen for 4 hours to decompose to the spinel oxide phase as confirmed by powder XRD. After flushing well with nitrogen the monoliths were then further calcined at 400° C. in flowing hydrogen for 30 minutes. The final weight of the monoliths was 1.22 g for a spinel loading of 6.9wt %. Results using this MgRh$_2$O$_4$ spinel on alpha-alumina monolith (5 mm deep catalyst bed) for syngas production in a 30 hr run are shown in Table 5, and summarized in Table 16.

TABLE 5

| Pressure | | Temp. (° C.) | | GHSV | | % CH₄ | % CO | % H₂ | |
|---|---|---|---|---|---|---|---|---|---|
| (psig) | (kPa) | Pre-H | Cat-B | (hr.⁻¹) | CH₄:O₂ | Conv. | Sel. | Sel. | H₂:CO |
| 2.8 | 121 | 498 | 850 | 531,000 | 2.0 | 94 | 100 | 101 | 2.03 |
| 3.0 | 122 | 503 | 939 | 546,000 | 1.9 | 99 | 100 | 99 | 1.97 |
| 6.9 | 149 | 496 | 899 | 796,000 | 2.0 | 92 | 103 | 100 | 1.94 |
| 7.4 | 152 | 497 | 938 | 809,000 | 1.9 | 98 | 101 | 101 | 1.92 |
| 8.2 | 158 | 497 | 1025 | 823,00 | 1.8 | 100 | 101 | 95 | 1.88 |
| 4.0 | 129 | 502 | 956 | 1,062,000 | 2.0 | 93 | 101 | 96 | 1.90 |
| 4.2 | 130 | 503 | 1015 | 1,079,000 | 1.9 | 98 | 99 | 94 | 1.89 |
| 4.4 | 130 | 503 | 1111 | 1,098,000 | 1.8 | 99 | 100 | 93 | 1.86 |

Example 6

4.1% Rh/CoAl₂O₄ on PSZ

Cobalt nitrate hydrate (1.64 g; 5.6 millimoles) and aluminum nitrate hydrate (4.24 g; 11.3 millimoles) were dissolved in distilled water (10 mL). The resulting solution was evaporated at room temperature and pressure in the presence of a PSZ monolith (14×38 mm; 80 ppi) weighing 17.87 g. The monolith was then calcined at 600° C. in air for 2 hours to decompose to the spinel oxide phase as confirmed by powder XRD and yield a spinel loading of 6.0 wt. %. The recovered monolith was then impregnated with a solution of rhodium chloride hydrate (2.13 g; 9.4 millimoles) dissolved in a minimum volume of acetone. The acetone was evaporated at room temperature and pressure. The monolith was re-calcined in air at 600° C. for 4 hour. After flushing well with nitrogen the monolith was then further calcined at 400° C. in flowing 1:1 nitrogen:hydrogen for 3 hours. The final weight of the monolith was 19.72 g for a Rh loading of 4.1 wt %. Results using this Rh deposited on CoAl₂O₄ spinel on PSZ monolith for syngas production are shown in Table 6, and summarized in Table 16

Example 7

11.82% CoRhAlO₄ on PSZ

A small 80 ppi PSZ monolith was weighed (0.388 g) and then immersed in a solution (2.0 mL) containing cobalt nitrate (116 mg), rhodium nitrate (132 mg) and aluminum nitrate (152 mg) in a Teflon® (poly(tetrafluoroethylene)) beaker. The solvent water was slowly evaporated thereby coating the monolith with the mixed nitrates. The impregnated monolith was then calcined in flowing air for 4 hours at 600° C. After this treatment the metals mixture was in the spinel phase as detected by powder XRD. The monolith was reduced in a flow of 100 mL/minute H₂ at 400° C. for 30 minutes, cooled and flushed with helium before testing in syngas production Results using this 11.82% CoRhAlO₄ on a 5 mm 80 ppi (MgO) PSZ monolith (0.440 g) for syngas production (38 hr run) are shown in Table 7, and summarized in Table 16.

TABLE 6

| Pressure | | Temp. (° C.) | | GHSV | | % CH₄ | % CO | % H₂ | |
|---|---|---|---|---|---|---|---|---|---|
| (psig) | (kPa) | Pre-H | Cat-B | (hr.⁻¹) | CH₄:O₂ | Conv. | Sel. | Sel. | H₂/CO |
| 45.0 | 411.20 | 450.0 | 1067.2 | 2057000 | 1.91 | 81.26% | 88.75% | 83.94% | 1.99 |
| 45.0 | 411.33 | 449.2 | 1022.5 | 1579000 | 1.91 | 81.81% | 89.14% | 84.51% | 2.13 |
| 44.7 | 409.48 | 450.0 | 1062.4 | 1785000 | 1.91 | 81.32% | 88.73% | 84.46% | 2.16 |
| 44.7 | 409.38 | 450.2 | 1060.7 | 1312000 | 1.91 | 82.57% | 89.43% | 84.86% | 2.21 |
| 56.4 | 489.54 | 450.0 | 1086.6 | 1802000 | 1.91 | 83.18% | 89.74% | 83.14% | 1.89 |
| 56.4 | 489.87 | 449.9 | 1128.7 | 2026000 | 1.91 | 81.93% | 88.96% | 82.47% | 1.81 |
| 56.4 | 489.59 | 449.8 | 1139.2 | 2273000 | 1.91 | 80.19% | 87.96% | 83.22% | 1.92 |
| 56.3 | 489.40 | 450.4 | 1118.0 | 1547000 | 1.91 | 81.76% | 89.25% | 84.01% | 2.03 |
| 45.6 | 415.77 | 449.6 | 1113.5 | 1599000 | 1.91 | 80.48% | 88.15% | 83.76% | 2.10 |
| 69.0 | 576.71 | 450.7 | 1098.6 | 1811000 | 1.91 | 80.27% | 90.21% | 83.39% | 1.96 |

TABLE 7

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 1.2 | 103 | 504 | 875 | 531,000 | 2.01 | 94 | 100 | 106 | 2.13 |
| 1.2 | 103 | 502 | 847 | 523,000 | 2.09 | 90 | 100 | 107 | 2.14 |
| 1.2 | 103 | 505 | 937 | 539,000 | 1.89 | 97 | 100 | 106 | 2.11 |
| 1.2 | 103 | 510 | 1037 | 548,000 | 1.82 | 99 | 97 | 101 | 2.08 |
| 1.2 | 103 | 500 | 883 | 531,000 | 2.03 | 71 | 100 | 113 | 2.26 |
| 3.3 | 124 | 501 | 1061 | 1,061,000 | 1.99 | 91 | 100 | 101 | 2.03 |
| 3.3 | 124 | 508 | 1047 | 1,015,000 | 2.06 | 88 | 100 | 102 | 2.04 |
| 1.2 | 103 | 501 | 970 | 531,000 | 2.00 | 91 | 100 | 105 | 2.11 |
| 1.2 | 103 | 504 | 1035 | 539,000 | 1.89 | 95 | 97 | 102 | 2.09 |
| 3.3 | 124 | 497 | 1211 | 1,061,000 | 1.96 | 89 | 97 | 97 | 2.01 |
| 3.4 | 125 | 503 | 1189 | 1,045,000 | 2.07 | 85 | 98 | 99 | 2.01 |

Example 8

15.4% CoRh$_2$O$_4$ on PSZ

A small 80 ppi PSZ monolith was weighed (0.495 g) and then immersed in a solution (2.5 mL) containing cobalt nitrate (116 mg) and rhodium nitrate (264 mg) in a Teflon® (poly(tetrafluoroethylene)) beaker. The solvent water was slowly evaporated thereby coating the monolith with the mixed nitrates. The impregnated monolith was then calcined in flowing air for 4 hours at 600° C. After this treatment the metals mixture was in the spinel phase as detected by powder XRD. The monolith was reduced in a flow of 100 mL/minute H$_2$ at 400° C. for 30 minutes, cooled, and flushed with helium before testing in syngas production. Results using this 15.4 wt % CoRh$_2$O$_4$ on 80 ppi (MgO) PSZ monolith (5 mm in length) for syngas production (31 hr run) are shown in Table 8, and summarized in Table 16.

TABLE 8

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 2.2 | 116 | 502 | 911 | 531,000 | 2.01 | 92 | 97 | 94 | 1.94 |
| 2.2 | 116 | 498 | 887 | 523,000 | 2.11 | 88 | 97 | 91 | 1.87 |
| 2.2 | 116 | 501 | 967 | 539,000 | 1.91 | 94 | 97 | 102 | 2.11 |
| 4.2 | 130 | 481 | 1057 | 1,061,000 | 1.97 | 89 | 97 | 99 | 2.04 |
| 4.2 | 130 | 500 | 1014 | 1,046,000 | 2.07 | 87 | 97 | 93 | 1.90 |
| 4.2 | 130 | 505 | 1063 | 1,061,000 | 2.02 | 90 | 97 | 95 | 1.95 |
| 4.2 | 130 | 505 | 1125 | 1,078,000 | 1.85 | 93 | 97 | 97 | 2.00 |

Example 9

7.5% RhLiTiO$_4$ on PSZ

A small 80 ppi PSZ monolith was weighed (0.591 g) and then immersed in a water solution (2.96 mL) containing lithium nitrate (21 mg), rhodium nitrate (96 mg) and titanium isopropoxide (84 mg) in a Teflon® (poly(tetrafluoroethylene)) beaker. The solvent water was slowly evaporated thereby coating the monolith with the mixed oxide/nitrates. The impregnated monolith was then calcined in flowing air for 4 hours at 600° C. After this treatment the metals mixture was in the spinel phase as detected by powder XRD. The monolith was reduced in a flow of 100 mL/minute H$_2$ at 400° C. for 30 minutes, cooled, and flushed with helium before testing in syngas production. Results using this 7.5 wt % RhLiTiO$_4$ on 80 ppi (MgO) PSZ monolith for syngas production are shown in Table 9, and summarized in Table 16.

TABLE 9

| Pressure | | Temp. (° C.) | | GHSV | | % CH₄ | % CO | % H₂ | |
|---|---|---|---|---|---|---|---|---|---|
| (psig) | (kPa) | Pre-H | Cat-B | (hr.⁻¹) | CH₄:O₂ | Conv. | Sel. | Sel. | H₂:CO |
| 1.1 | 109 | 499 | 975 | 531,000 | 2.02 | 85 | 97 | 97 | 2.00 |
| 1.1 | 109 | 500 | 947 | 523,000 | 2.12 | 81 | 97 | 98 | 2.01 |
| 1.1 | 109 | 502 | 1023 | 539,000 | 1.91 | 88 | 97 | 96 | 1.98 |
| 3.6 | 126 | 511 | 1114 | 1,061,000 | 1.98 | 91 | 96 | 90 | 1.87 |
| 3.6 | 126 | 514 | 1089 | 1,046,000 | 2.08 | 77 | 96 | 91 | 1.90 |
| 3.6 | 126 | 518 | 1203 | 1,078,000 | 1.89 | 83 | 94 | 88 | 1.87 |

Example 10

CaRh$_2$O$_4$ on PSZ

A small 80 ppi PSZ monolith was weighed (0.586 g) and then immersed in a water solution (2.93 mL) containing calcium nitrate (69 mg) and rhodium nitrate (191 mg) in a Teflon® (poly(tetrafluoroethylene)) beaker. The solvent water was slowly evaporated thereby coating the monolith with the mixed nitrates. The impregnated monolith was then calcined in flowing air for 4 hours at 600° C. After this treatment the metals mixture was in the spinel phase as detected by powder XRD. The monolith was reduced in a flow of 100 mL/minute H$_2$ at 400° C. for 30 minutes, cooled, and flushed with helium before testing in syngas production. Results using this 13.8 wt % CaRh$_2$O$_4$ on 80 ppi (MgO) PSZ monolith for syngas production are shown in Table 10 and summarized in Table 10.

TABLE 10

| Pressure | | Temp. (° C.) | | GHSV | | % CH₄ | % CO | % H₂ | |
|---|---|---|---|---|---|---|---|---|---|
| (psig) | (kPa) | Pre-H | Cat-B | (hr.⁻¹) | CH₄:O₂ | Conv. | Sel. | Sel. | H₂:CO |
| 2.1 | 116 | 501 | 806 | 532,000 | 2.01 | 93 | 98 | 103 | 2.11 |
| 2.1 | 116 | 503 | 844 | 540,000 | 1.91 | 96 | 98 | 101 | 2.08 |
| 4.2 | 130 | 501 | 911 | 1,061,000 | 1.97 | 90 | 97 | 101 | 2.07 |
| 4.2 | 130 | 504 | 983 | 1,078,000 | 1.89 | 91 | 97 | 97 | 2.00 |
| 4.2 | 130 | 502 | 888 | 1,045,000 | 2.08 | 85 | 97 | 99 | 2.04 |
| 2.2 | 117 | 598 | 854 | 531,000 | 2.02 | 92 | 98 | 103 | 2.10 |
| 1.9 | 114 | 602 | 902 | 540,000 | 1.96 | 94 | 98 | 94 | 1.93 |

Example 11

CuRh$_2$O$_4$ on PSZ

A small 80 ppi PSZ monolith was weighed (0.601 g) and then immersed in a solution (3.00 mL) containing copper nitrate (73 mg) and rhodium nitrate (196 mg) in a Teflon® poly(tetrafluoroethylene)) beaker. The solvent water was slowly evaporated thereby coating the monolith with the mixed nitrates. The impregnated monolith was then calcined in flowing air for 4 hours at 600° C. After this treatment the metals mixture was in the spinel phase as detected by powder XRD. The monolith was reduced in a flow of 100 mL/minute H$_2$ at 400° C. for 30 minutes, cooled, and flushed with helium before testing in syngas production. Results using this 9.6 wt % CuRh$_2$O$_4$ on 80 ppi (MgO) PSZ monolith for syngas production are shown in Table 11 and summarized in Table 16.

TABLE 11

| Pressure | | Temp. (° C.) | | GHSV | | % CH₄ | % CO | % H₂ | |
|---|---|---|---|---|---|---|---|---|---|
| (psig) | (kPa) | Pre-H | Cat-B | (hr.⁻¹) | CH₄:O₂ | Conv. | Sel. | Sel. | H₂:CO |
| 2.1 | 116 | 495 | 1010 | 531,000 | 2.02 | 84 | 97 | 94 | 1.94 |
| 2.1 | 116 | 489 | 980 | 540,000 | 1.92 | 91 | 98 | 98 | 2.00 |
| 2.1 | 116 | 502 | 956 | 524,000 | 2.12 | 82 | 98 | 98 | 2.01 |

TABLE 11-continued

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 4.2 | 130 | 501 | 1052 | 1,062,000 | 1.99 | 87 | 98 | 98 | 2.01 |
| 4.2 | 130 | 504 | 1071 | 1,078,000 | 1.89 | 91 | 97 | 96 | 1.98 |

Example 12

ZnRh$_2$O$_4$ on PSZ

A small 80 ppi PSZ monolith was weighed (0.638 g) and then immersed in a solution (3.2 mL) containing zinc nitrate (95 mg) and rhodium nitrate (209 mg) in a Teflon® (poly(tetrafluoroethylene)) beaker. The solvent water was slowly evaporated thereby coating the monolith with the mixed nitrates. The impregnated monolith was then calcined in flowing air for 4 hours at 600° C. After this treatment the metals mixture was in the spinel phase as detected by powder XRD. The monolith was reduced in a flow of 100 mL/minute H$_2$ at 400° C. for 30 minutes, cooled, and flushed with helium before testing in syngas production. Results using this 13.9 wt % ZnRh$_2$O$_4$ on 80 ppi (MgO) PSZ monolith for syngas production are shown in Table 12 and summarized in Table 16.

TABLE 12

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 2.6 | 119 | 498 | 917 | 532,000 | 2.02 | 92 | 98 | 102 | 2.08 |
| 2.6 | 119 | 496 | 955 | 540,000 | 1.92 | 96 | 98 | 101 | 2.06 |
| 2.6 | 119 | 491 | 908 | 524,000 | 2.14 | 88 | 98 | 101 | 2.06 |
| 4.6 | 133 | 505 | 1024 | 1,062,000 | 1.98 | 93 | 98 | 100 | 2.03 |
| 4.6 | 133 | 509 | 1093 | 1,078,000 | 1.87 | 95 | 98 | 100 | 2.04 |
| 2.6 | 119 | 501 | 941 | 531,000 | 2.02 | 91 | 98 | 96 | 1.96 |
| 1.6 | 112 | 500 | 925 | 524,000 | 2.17 | 87 | 98 | 95 | 1.93 |
| 1.6 | 112 | 506 | 958 | 539,000 | 1.92 | 96 | 98 | 101 | 2.06 |
| 4.8 | 134 | 506 | 1010 | 1,053,000 | 1.98 | 90 | 98 | 106 | 2.16 |
| 4.8 | 134 | 509 | 1072 | 1,078,000 | 1.90 | 96 | 98 | 96 | 1.96 |

Example 13

CdRh$_2$O$_4$ on PSZ

A small 80 ppi PSZ monolith was weighed (0.566 g) and then immersed in a solution (2.83 mL) containing cadmium nitrate (87 mg) and rhodium nitrate (185 mg) in a Teflon® (poly(tetrafluoroethylene)) beaker. The solvent water was slowly evaporated thereby coating the monolith with the mixed oxide/nitrates. The impregnated monolith was then calcined in flowing air for 4 hours at 600° C. After this treatment the metals mixture was in the spinel phase as detected by powder XRD. The monolith was reduced in a flow of 100 mL/minute H$_2$ at 400° C. for 30 minutes, cooled, and flushed with helium before testing in syngas production. Results using this 15.8 wt % CdRh$_2$O$_4$ on 80 ppi (MgO) PSZ monolith for syngas production are shown in Table 13, and summarized in Table 16.

TABLE 13

| Pressure | | Temp. (° C.) | | GHSV | | % CH$_4$ | % CO | % H$_2$ | |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 2.5 | 119 | 500 | 904 | 532,000 | 1.99 | 85 | 98 | 88 | 1.80 |
| 2.5 | 119 | 500 | 894 | 524,000 | 2.17 | 85 | 98 | 93 | 1.90 |
| 2.1 | 119 | 502 | 920 | 540,000 | 1.90 | 94 | 98 | 96 | 1.96 |

TABLE 13-continued

| Pressure | | Temp. (° C.) | | GHSV | | | % CH$_4$ | % CO | % H$_2$ | |
|---|---|---|---|---|---|---|---|---|---|---|
| (psig) | (kPa) | Pre-H | Cat-B | (hr.$^{-1}$) | CH$_4$:O$_2$ | Conv. | Sel. | Sel. | H$_2$:CO |
| 4.4 | 132 | 505 | 981 | 1,045,000 | 2.04 | 85 | 98 | 96 | 1.95 |
| 4.1 | 130 | 504 | 984 | 1,061,000 | 1.94 | 90 | 98 | 98 | 2.00 |

Example A

CoAl$_2$O$_4$ Spinel on PSZ (Comparative)

Cobalt nitrate hydrate (1.45 g) and aluminum nitrate hydrate (3.75 g) were dissolved in distilled water (10 mL). Part of the resulting solution (0.50 mL) was evaporated at room temperature and pressure in the presence of an alpha-alumina monolith (5×12 mm; 80 ppi) weighing 0.50 g. The alumina deposited nitrates were then calcined at 800° C. in pure oxygen for 4 hours to decompose to the spinel oxide phase as confirmed by powder XRD. After flushing well with nitrogen the monolith was then further calcined at 400° C. in flowing 90:10 helium:hydrogen for 4 hours. The final weight of the monolith was 0.530 g for a spinel loading of 5.66 wt %. Results obtained with this catalyst indicate only CO$_2$ and H$_2$O products were detected after 1 hr under syngas production conditions, as shown in Table 14, and summarized in Table 16.

TABLE 14

| Pressure | | Temp. (° C.) | | GHSV | | | % CH$_4$ | % CO | % H$_2$ |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | |
| 0.1 | 102 | 346 | 1200 | 470,000 | 1.97 | 15 | 0 | 0 | |
| 0.1 | 102 | 346 | 1197 | 470,000 | 1.97 | 8 | 0 | 0 | |

Example B

Co on Alumina (Comparative)

Inside a nitrogen filled glove box, an 80 ppi alumina monolith was weighed (1.183 g) and then immersed into a methylene chloride solution (10 mL) containing dicobalt octacarbonyl (0.372 g) in a Teflon® (poly(tetrafluoroethylene)) beaker. The solvent was slowly evaporated thereby coating the monolith with the cobalt carbonyl. The impregnated monolith was then calcined in flowing 100 mL/minute H$_2$ by heating to 100° C. for 30 minutes. The sample was heated to 400° C. for a further 2 hours then cooled, flushed with helium and collected in a glove box for testing in syngas production. Results using this 4.75% Co on 80 ppi Al$_2$O$_3$ (1.242 g) syngas production are shown in Table 15, and summarized in Table 16.

TABLE 15

| Pressure | | Temp. (° C.) | | GHSV | | | % CH$_4$ | % CO | % H$_2$ |
|---|---|---|---|---|---|---|---|---|---|
| (psig) | (kPa) | Pre-H | Cat-B | (hr.$^{-1}$) | CH$_4$:O$_2$ | Conv. | Sel. | Sel. | |
| 0.1 | 102 | 500 | 864 | — | 1.82 | 0 | 0 | 0 | |
| 0.1 | 102 | 500 | 797 | — | 1.83 | 0 | 0 | 0 | |

TABLE 16

SUMMARY OF CATALYST COMPOSITIONS AND RUN TIMES

| EX. | COMPOSITION | MONOLITH SUPPORT | LENGTH | HRS. | MAX. SV (L/L/hr) | CAT WT. (g.) | CAT. DENS. (g/ml) | WT. HR. SV (NL/kg/hr) |
|---|---|---|---|---|---|---|---|---|
| 1 | 5.11% Rh/5.88% CoAl$_2$O$_4$ spinel | 80 ppi α-Al$_2$O$_3$ | 10 mm | 29 | 549,000 | 1.605 | 1.419 | 381,000 |
| | | | | 46 | 548,000 | | | 380,000 |

TABLE 16-continued

SUMMARY OF CATALYST COMPOSITIONS AND RUN TIMES

| EX. | COMPOSITION | MONOLITH SUPPORT | LENGTH | HRS. | MAX. SV (L/L/hr) | CAT WT. (g.) | CAT. DENS. (g/ml) | WT. HR. SV (NL/kg/hr) |
|---|---|---|---|---|---|---|---|---|
| 2 | 4.85% Rh/4.8% $NiAl_2O_4$ spinel | 80 ppi $\alpha$-$Al_2O_3$ | 5 mm | 17 | 1,700,000 | 1.403 | 2.481 | 685,000 |
| 3 | 5.3%Rh/4.04%$CoAl_2O_4$ spinel | 80 ppi (MgO)PSZ | 10 mm | 36 | 549,000 | 1.017 | 0.899 | 611,000 |
| 4 | 13.1% $CoRhAlO_4$ spinel | 80 ppi (MgO)PSZ | 10 mm | 25 | 549,000 | 0.978 | 0.865 | 635,000 |
| 5 | 6.9% $MgRh_2O_4$ spinel | 80 ppi $\alpha$-$A_2O_3$ | 5 mm | 30 | 1,000,000 | 1.22 | 2.159 | 463,000 |
| 6 | 4.1% Rh/6%$CoAl_2O_4$ | 80 ppi (MgO)PSZ | 14 mm | 62 | 2,273,000 | 19.72 | 2.485 g/ml | 914,000 |
| 7 | 11.82%$CoRhAlO_4$ spinel | 80 ppi (MgO)PSZ | 5 mm | 38 | 1,061,000 | 0.44 | 0.79 | 1,362,000 |
| 8 | 15.4%$CoRh_2O_4$ spinel | 80 ppi (MgO)PSZ | 5 mm | 31 | 1,000,000 | 0.585 | 1.035 | 966,000 |
| 9 | 7.5%$RhLiTiO_4$ spinel | 80 ppi (MgO)PSZ | 5 mm | 26 | 1,080,000 | 0.639 | 1.131 | 955,000 |
| 10 | 13.8%$CaRh_2O_4$ spinel | 80 ppi (MgO)PSZ | 5 mm | 16 | 1,077,000 | 0.68 | 1.204 | 895,000 |
| 11 | 9.6%$CuRh_2O_4$ spinel | 80 ppi (MgO)PSZ | 5 mm | 26 | 1,077,000 | 0.665 | 1.177 | 915,000 |
| 12 | 13.9% $ZnRh_2O_4$ spinel | 80 ppi (MgO)PSZ | 5 mm | 48 | 1,078,000 | 0.741 | 1.312 | 822,000 |
| 13 | 15.8%$CdRh_2O_4$ spinel | 80 ppi (MgO)PSZ | 5 mm | 17 | 1,077,000 | 0.672 | 1.189 | 906,000 |
| Comparative Examples: | | | | | | | | |
| A | 5.7% $CoAlO_4$ spinel | 80 ppi (MgO)PSZ | 5 mm | 1 | 470,000 | 0.53 | 0.938 | 501,000 |
| B | 4.75% Co | 80 ppi $\alpha$-$Al_2O_3$ | 10 mm | 1 | 125,000 | 1.242 | 1.098 | 114,000 |

The most preferred of the above-described monolith catalysts or divided catalyst beds for use in large scale production have sufficient porosity, or sufficiently low resistance to gas flow, to permit the flow of reactant gases over the catalyst at a gas hourly space velocity (GHSV) of at least about 100,000 $hr^{-1}$, which corresponds to a weight hourly space velocity (WHSV) of about 1000 $hr^{-1}$.

Process of Producing Syngas

A process for producing synthesis gas employs a rhodium-spinel containing monolith or divided catalyst that is active for catalyzing the conversion of methane or natural gas and molecular oxygen to primarily CO and $H_2$ by a net catalytic partial oxidation (CPOX) reaction. Suitable Rh-spinel catalysts are prepared as described in the foregoing examples. Preferably employing a fast contact (i.e., millisecond range)/fast quench (i.e., less than one second) reactor, a feed stream comprising a hydrocarbon feedstock and an $O_2$-containing gas are mixed together and contacted with the catalyst. One suitable reaction regime is a fixed bed reaction regime, in which the catalyst is retained within a reaction zone in a fixed arrangement, as schematically shown in FIG. 1.

FIG. 1 is a cross-sectional view showing a preferred configuration of the interior of a preferred "short" contact time reactor 10, suitable for producing synthesis gas by partial oxidation of a light hydrocarbon. Very generally described, the reactor is essentially a tube made of materials capable of withstanding at least the temperatures generated by the exothermic CPOX reaction set out in Reaction 3 (in the case of methane as the feed hydrocarbon). Reactor 10 includes, in sequence, feed injection openings 12, 14, a mixing zone 19, a reaction zone 20 and a cooling zone 30. In mixing zone 19 is static mixer 18, which can be simply a series of vanes that extend into the flow path of the reactant gas mixture. Reaction zone 20 preferably includes a thermal radiation shield or barrier 22 positioned immediately upstream of a catalyst or catalytic device 24 in a fixed-bed configuration. Radiation barrier 22 is preferably a porous ceramic or refractory material that is suited to withstand the reactor operating temperatures and provide sufficient thermal insulation to the unreacted gases in the mixing zone 19. It is highly preferred that there be a minimum of void or dead spaces in the areas of the reactor that are occupied by the mixing reactant gas in order to minimize the opportunity for gas stagnation and undesirable combustion reactions to occur before the reactant gas stream comes into contact with hot catalyst. A second barrier 22 may be positioned on the downstream side of the catalyst to retain the catalyst bed and to thermally insulate the reacted gases entering cooling zone 30. Such refractory materials are well known in the art. In commercial scale operations the reactor may be constructed of, or lined with, any suitable refractory material that is capable of withstanding the temperatures generated by the exothermic CPOX reaction, or at least 1,600° C., preferably up to about 2,000° C.

The catalyst 24 comprises a rhodium-spinel composition and is positioned in reaction zone 20 in the flow path of the feed gas mixture. The catalyst 24 is preferably in the form of one or more porous monoliths or a bed of discrete or divided units or structures that is held between two porous refractory disks (i.e., irradiation barriers 22). Representative catalytically active Rh-spinel compositions are described in the foregoing examples. Following the reaction zone 20 is cooling zone 30.

In operation, a stream of light hydrocarbon, such as methane, is fed into feed injection opening 12. Air or oxygen is fed into a second injection opening 14, which is preferably positioned close to catalyst 24. It should be understood that the feed injection openings in the reactor can be configured differently from the configuration shown in FIG. 1 without affecting the principles or operation of the process. For example, $O_2$ injection opening 14 could be positioned such that the oxygen is mixed with the light hydrocarbon during the contacting of the feed gas stream with a hot catalyst. Such a configuration may help reduce the occurrence of unwanted side reactions that might otherwise rapidly occur during or after mixing of $O_2$ with the $H_2S$ and hydrocarbon components but prior to contacting the catalytic surfaces of the reaction zone. Also, the manner of mixing the gases could be modified. Air, or a mixture of air and oxygen can be substituted for the pure oxygen. However, since the presence of $N_2$ in the reactant gas mixture can be problematic (e.g., forming unwanted nitrogen-containing compounds), it is usually preferable to use pure oxygen instead of air. The hydrocarbon feedstock may be any gaseous hydrocarbon having a low boiling point, such as methane, natural gas, associated gas, or other sources of light hydrocarbons or alkanes having from 1 to 5 carbon atoms. The hydrocarbon feedstock may be a gas arising from naturally occurring reserves of methane, which contain carbon dioxide. Preferably, the feed comprises at least about 80% by volume methane. The hydrocarbon feedstock may also include some steam and/or $CO_2$, as sometimes occurs in natural gas deposits. The methane-containing feed and the $O_2$-containing feed are mixed in such amounts as to give a carbon (i.e., carbon in methane) to oxygen (i.e., molecular oxygen) molar ratio from about 1.5:1 to about 3.3:1, more preferably, from about 1.7:1 to about 2.1:1. The stoichiometric molar ratio of about 2:1 ($CH_4$:$O_2$) is especially desirable in obtaining the net partial oxidation reaction products ratio of 2:1 $H_2$:CO. The hydrocarbon or reactant gas mixture is preferably preheated to about 30° C.–750° C. before contacting the catalyst.

As the feed gases from feed injection openings 12 and 14 flow toward catalytic device 24, they are subjected to thorough mixing by static mixer 18, which can be simply a series of vanes that extend into the flow path of the reactant gas mixture. Alternatively, a more elaborate mixing means could be substituted. During mixing, the feed gases are shielded by radiation barrier 22 from radiant heat that is generated downstream in the process. It is preferred that the temperature on the upstream side of barrier 22 be in the range of about 30° C. to about 500° C., preferably no more than about 750° C., to help initiate the CPOX reaction. Excessive preheating the feed gases can cause unwanted homogeneous reactions to occur that reduce the selectivity of the process for the desired CO and $H_2$ products. In some instances, it may also be desirable to briefly supplement the hydrocarbon feed with propane or another pure hydrocarbon to facilitate rapid initiation of the CPOX reaction. After the gases pass barrier 22, they flow past catalytic device 24 and are simultaneously heated to 350° C.–2,000° C., preferably not exceeding 1,500° C., and more preferably staying in the range of about 400° C. to about 1,200° C.

The preheated feed gases pass over the catalyst to the point at which the partial oxidation reaction initiates. An overall or net catalytic partial oxidation (CPOX) reaction ensues, and the reaction conditions are maintained to promote continuation of the process, which preferably is sustained autothermally. The term "autothermal" means that after initiation of the partial oxidation reaction, no additional or external heat must be supplied to the catalyst in order for the production of synthesis gas to continue. Under autothermal reaction conditions the hydrocarbon feed is partially oxidized and the heat produced by that exothermic reaction drives the continued net partial oxidation reaction. Consequently, under autothermal process conditions there is no external heat source required.

The gas flow rate is preferably maintained such that the contact time for each portion of the gas stream that contacts the catalyst is no more than about 200 milliseconds, more preferably under 50 milliseconds, and still more preferably 20 milliseconds or less. This degree of contact produces a favorable balance between competing reactions and produces sufficient heat to maintain the catalyst at the desired temperature. Exposure to the hot catalyst and oxygen partially oxidizes the light hydrocarbons in the feed according to the CPOX reaction (Reaction 4, in the case of methane):

$$CH_4 + \tfrac{1}{2}O_2 \rightarrow CO + 2H_2 \tag{4}$$

It is preferred to keep the stoichiometric molar ratio of carbon: oxygen at about 1.5:1 to 2.2:1, to favor the CPOX reaction. This is best accomplished by monitoring and adjusting during operation the composition, temperature, and flow rates of the feed gases, as further described below. For example, by establishing and maintaining process conditions favoring CPOX over the hydrocarbon combustion reaction (Reaction 5, in the case of methane)

$$CH_4 + 2O_2 \rightarrow CO_2 + 2H_2O \tag{5}$$

the conversion of the carbon atoms contained in the hydrocarbon molecules to $CO_2$ is less likely to occur. In this way the $CO_2$ content of the product gases is minimized and the selectivity for CO and $H_2$ products is enhanced. In some situations it may be helpful to heat the catalyst using external means, at least at the start of the process, so as to facilitate initiation of the exothermic reactions on the catalyst structure. Once the process is commenced, it is preferably run adiabatically or nearly adiabatically (i.e., without loss of heat), so as to reduce the formation of carbon (e.g., coke) on the surface of the catalyst. Preferably the catalyst is heated sufficiently as a result of the exothermic chemical reactions occurring at its surface to perpetuate the CPOX reaction under favorable conditions of reactant gas molar ratios, flow rate and catalyst contact time. Heating by external means, or otherwise adjusting the temperature toward the higher end of the preferred operating range (i.e., 400° C.–1,500° C.) can allow for increases in the rate at which feed gas can be passed through the catalyst structure while still obtaining desirable reaction products.

The hydrocarbon feedstock and the oxygen-containing gas may be passed over the catalyst at any of a variety of space velocities. Space velocities for the process, stated as gas hourly space velocity (GHSV), are in the range of about 20,000 to about 100,000,000 $hr^{-1}$. Although for ease in comparison with prior art systems space velocities at standard conditions have been used to describe the present invention, it is well recognized in the art that residence time is the inverse of space velocity and that the disclosure of high space velocities corresponds to low residence times on the catalyst. "Space velocity," as that term is customarily used in chemical process descriptions, is typically expressed as volumetric gas hourly space velocity in units of $hr^{-1}$. Under these operating conditions a flow rate of reactant gases is maintained sufficient to ensure a residence or dwell time of each portion of reactant gas mixture in contact with the catalyst of no more than 200 milliseconds, preferably less than 50 milliseconds, and still more preferably less than 20 milliseconds. A contact time of 10 milliseconds is highly preferred. The duration or degree of contact is preferably regulated so as to produce a favorable balance between competing reactions and to produce sufficient heat to maintain the catalyst at the desired temperature.

In order to obtain the desired high space velocities, the process is operated at atmospheric or superatmospheric pressures. The pressures may be in the range of about 100 kPa to about 32,000 kPa (about 1–320 atm), preferably from about 200 kPa to 10,000 kPa (about 2–100 atm). Preferably the reactor is operated at a reactant gas pressure greater than 1 atmosphere (>100 kPa), more preferably above 2 atmospheres, which is advantageous for optimizing syngas production space-time yields.

The process is operated at a temperature in the range of about 350° C. to about 2,000° C., preferably less than 1,500° C., more preferably the temperature is maintained in the range 400° C.–1,200° C., as measured at the reactor outlet.

The product gas mixture emerging from the cooling zone 30 of reactor 10 is harvested and may be routed directly into any of a variety of applications, preferably at pressure. One such application for the CO and $H_2$ product stream is for producing higher molecular weight hydrocarbon compounds using Fischer-Tropsch technology.

Net catalytic partial oxidation reaction promoting conditions. The process parameters that can be manipulated or controlled in such a way as to favor the CPOX reaction over other hydrocarbon reactions include optimizing the relative concentrations of hydrocarbon and $O_2$ in the reactant gas mixture. Preferably the relative amounts of carbon and oxygen are held within the range of about a 1.5:1 to about 3.3:1 ratio of carbon:$O_2$ by weight, more preferably from about 1.7:1 to about 2.1:1. The stoichiometric molar ratio of about 2:1 ($CH_4$:$O_2$) is especially desirable in obtaining a $H_2$:CO molar ratio of 2:1. Before contacting the catalyst the hydrocarbon or reactant gas mixture is preferably preheated to about 30° C.–500° C., preferably no more than about 750° C., to help initiate the CPOX reaction. Excessive preheating of the feed gases is avoided in order to deter unwanted homogeneous reactions that would reduce the selectivity of the process for the desired CO and $H_2$ products.

If the situation demands, steam may also be added to produce extra hydrogen and to control (i.e., reduce) the outlet temperature. In this case the ratio of steam to carbon (by weight) preferably ranges from 0 to 1. The carbon:$O_2$ ratio is the most important variable for maintaining the autothermal reaction and the desired product selectivities. Pressure, residence time, amount of feed preheat and amount of nitrogen dilution, if used, also affect the reaction products. Although less desired, in some instances the reactant gas mixture may be temporarily supplemented with nitrogen to serve as a coolant or diluent. During operation of the reactor, short contact time is maintained which may vary over the range of less than 10 milliseconds up to about 200 milliseconds. Preferably contact time is less than 200 milliseconds, more preferably under 50 milliseconds, and still more preferably 10–20 milliseconds or even less. This is accomplished by passing the reactant gas mixture over the catalyst at a preferred gas hourly space velocity of about 100,000–25,000,000 $hr^{-1}$. This range of preferred gas hourly space velocities corresponds to a weight hourly space velocity of 1,000 to 25,000 $hr^{-1}$.

When employing a Rh-spinel catalyst monolith or packed bed of divided catalyst, the surface area, depth of the catalyst bed, and gas flow rate (space velocity) are preferably chosen, or adjusted during operation, as applicable, so as to ensure the desired or optimal conversion efficiency and product selectivities. The preferred catalyst bed length to diameter ratio is ≦1/8. Under preferred CPOX promoting conditions with a methane feed, a Rh-spinel catalyst, as exemplified above, catalyzes the net partial oxidation of at least 90% of the $CH_4$ feed to CO and $H_2$ with a selectivity for CO and $H_2$ products of at least about 90% CO and 90% $H_2$.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications and publications cited herein are incorporated by reference. The discussion of certain references in the Description of Related Art, above, is not an admission that they are prior art to the present invention, especially any references that may have a publication date after the priority date of this application.

What is claimed is:

1. A method of producing synthesis gas comprising:
   contacting a reactant gas mixture comprising $C_1$–$C_5$ hydrocarbon-containing gas and $O_2$-containing gas with a catalytically effective amount of a catalyst comprising a catalytic composition
   comprising Rh deposited on a spinel having the general formula $MAl_2O_4$, wherein M is at least one metal having a +2 oxidation state, said catalytic composition being carried on a refractory support; and
   maintaining net partial oxidation reaction promoting conditions and superatmospheric pressure such that a product gas mixture comprising $H_2$ and CO is produced.

2. The method of claim 1 wherein said M in the spinel general formula $MAl_2O_4$, is chosen from the group consisting of Co, Al, Li, Ti, Ni, Mn, Cd, Zn, Cu, Mg, Ca, Fe, Mo and La, and mixtures thereof.

3. The method of claim 2 wherein said M is chosen from the group consisting of Mg, Co and Ni, and mixtures thereof.

4. The method of claim 1 comprising combining a hydrocarbon-containing feedstock and an oxygen-containing feedstock to provide a reactant gas mixture having a carbon:oxygen ratio of about 1.5:1 to about 3.3:1.

5. The method of claim 4 wherein the carbon:oxygen ratio is about 1.7:1 to about 2.1:1.

6. The method of claim 5 wherein the carbon:oxygen ratio is about 2:1.

7. The method of claim 1 wherein the $C_1$–$C_5$ hydrocarbon comprises at least about 80% methane by volume.

8. The method of claim 1 further comprising preheating the hydrocarbon before contacting the catalyst.

9. The method of claim 8 wherein the preheating comprises heating the hydrocarbon to a temperature in the range of about 30° C. to about 750° C.

10. The method of claim 1 comprising passing a stream of the reactant gas mixture over the catalyst at a gas hourly space velocity in the range of 20,000 to 100,000,000 $hr^{-1}$.

11. The method of claim 10 wherein the gas hourly space velocity is in the range of 100,000 to 25,000,000 $hr^{-1}$.

12. The method of claim 1 comprising maintaining a catalyst temperature in the range of about 350° C.–1,500° C. during the contacting.

13. The method of claim 12 wherein the temperature is in the range of 400–1,200° C.

14. The method of claim 1 comprising maintaining a reactant gas mixture pressure of 200 to 32,000 kPa during the contacting.

15. The method of claim 14 wherein the pressure is in the range of about 200–10,000 kPa.

16. The method of claim 1 wherein the reactant gas mixture comprises steam and/or $CO_2$.

17. The method of claim 1 wherein said product gas mixture comprises a $H_2$ to CO molar ratio of about 2:1.

18. The method of claim 1 wherein the contacting comprises a residence time of each portion of reactant gas mixture in contact with the catalyst of no more than about 200 milliseconds.

19. The method of claim 18 wherein the contacting comprises a residence time of each portion of reactant gas mixture in contact with the catalyst less than 50 milliseconds.

20. The method of claim 19 wherein the contacting comprises a residence time of each portion of reactant gas mixture in contact with the catalyst less than 20 milliseconds.

21. The method of claim 20 wherein the contacting comprises a residence time of each portion of reactant gas mixture in contact with the catalyst less than 10 milliseconds.

22. The method of claim 1 wherein the catalyst comprises 0.1–10 wt. % rhodium (based on total catalyst weight).

23. The method of claim 22 wherein the catalyst comprises about 4–5 wt % Rh.

24. The method of claim 1 wherein the support comprises a material selected from the group consisting of zirconia, magnesium stabilized zirconia (PSZ), alpha-alumina, cordierite, zirconia-tetra-alumina, oxide-bonded silicon carbide, mullite, lithium aluminum silicate, sialon, a titanate, fused silica, magnesia, yttrium aluminum garnet and boron nitride.

25. The method of claim 24 wherein the support comprises zirconia, alpha-alumina or PSZ.

26. The method of claim 1 wherein the support comprises a foam monolith having about 30–150 pores per inch (12–60 pores per cm).

27. The method of claim 1 wherein the catalyst comprises Rh deposited on a $CoAl_2O_4$ spinel-coated refractory support.

28. The method of claim 1 wherein the catalyst comprises Rh deposited on a $NiAl_2O_4$ spinel-coated refractory support.

29. The method of claim 1 wherein the catalyst comprises Rh deposited on a $MgAl_2O_4$ spinel-coated refractory support.

30. The method of claim 1 wherein the catalyst comprises a plurality of divided units.

31. The method of claim 30 wherein said divided units comprise particles, granules, beads, pills, pellets, cylinders, trilobes, extrudates or spheres.

32. The method of claim 30 wherein each said divided unit is less than 10 millimeters in its longest dimension.

33. The method of claim 32 wherein each said divided unit is ≦6 millimeters in its longest dimension.

34. A catalyst active for catalyzing the net partial oxidation of methane to synthesis gas comprising $H_2$ and CO, said catalyst comprising about 0.1–10 wt % Rb in the form of at least one spinel compound having the general formula $MRh_2O_4$ or $MM'RhO_4$ wherein M and M' are at least one metal chosen from the group consisting of Co, Mg, Al, B, V, La, Li, Ti, Ca, Cu, Zn, Cd, Mn, Ga, Ni, Fe, Ag, Mo, Na, Pt, and Cr, said spinel being disposed on a support, and said catalyst being mechanically stable at gas pressures greater than 2 atmospheres.

35. The catalyst of claim 34 wherein the support comprises a refractory material.

36. The catalyst of claint 35 wherein said support comprises a monolith.

37. The catalyst of claim 35 wherein said support comprises a plurality of divided units.

38. The catalyst of claim 37 wherein said divided units comprise particles, granules, beads, pills, pellets, cylinders, trilobes, extrudates or spheres.

39. The catalyst of claim 37 wherein each said divided unit is less than 10 millimeters in its longest dimension.

40. The catalyst of claim 39 wherein each said divided unit is ≦6 millimeters in its longest dimension.

41. The catalyst of claim 34 wherein said support comprises a material selected from the group consisting of zirconia, magnesium stabilized zirconia (PSZ), alpha-alumina, cordierite, zirconia-tetra-alumina, oxide-bonded silicon carbide, mullite, lithium aluminum silicate, sialon, a titanate, fused silica, magnesia, yttrium aluminum garnet and boron nitride.

42. The catalyst of claim 34 wherein said spinel is chosen from the group consisting of $CoRh_2O_4$, $MgRh_2O_4$, $CoRhAlO_4$, $RhLiTiO_4$, $CaRh_2O_4$, $CuRh_2O_4$, $ZnRh_2O_4$, and $CdRh_2O_4$.

43. A method of producing synthesis gas comprising:

contacting a reactant gas mixture comprising $C_1$–$C_5$ hydrocarbon-containing gas and $O_2$-containing gas with a catalytically effective amount of a catalyst comprising a spinel having the general formula $MRh_2O_4$ or $MM'RhO_4$ wherein M and M' are at least one metal chosen from the group consisting of Co, Mg, Al, Li, Ti, Ca, Cu, Zn, Cd, Mn, Ga and Cr; and maintaining net partial oxidation reaction promoting conditions and superatmospheric pressure such that a product gas mixture comprising $H_2$ and CO is produced.

44. The method of claim 43 wherein the catalyst comprises $CoRh_2O_4$ spinel on a refractory support.

45. The method of claim 43 wherein the catalyst comprises $MgRh_2O_4$ spinel an a refractory support.

46. The method of claim 43 wherein the catalyst comprises $CoRhAlO_4$ spinel on a refractory support.

47. The method of claim 43 wherein the catalyst comprises $CoRh_2O_4$ spinel on a refractory support.

48. The method of claim 43 wherein the catalyst comprises $RhLiTiO_4$ spinel on a refractory support.

49. The method of claim 43 wherein the catalyst comprises $CaRh_2O_4$ spinel on a refractory support.

50. The method of claim 43 wherein the catalyst comprises $CuRh_2O_4$ spinel on a refractory support.

51. The method of claim 43 wherein the catalyst comprises $ZnRh_2O_4$ spinel on a refractory support.

52. The method of claim 43 wherein the catalyst comprises $CdRh_2O_4$ spinel on a refractory support.

53. The method of claim 43 wherein the catalyst further comprises a refractory support structure selected from the group consisting of zirconia, magnesium stabilized zirconia (PSZ), alpha-alumina, cordierite, zirconia-tetra-alumina, oxide-bonded silicon carbide, mullite, lithium aluminum silicate, sialon, a titanate, fused silica, magnesia, yttrium aluminum garnet and boron nitride.

54. The method of claim 43 wherein the catalyst comprises a spinel disposed on a refractory support, said spinel being chosen from the group consisting of $CoRh_2O_4$, $MgRh_2O_4$, $CoRhAlO_4$, $RhLiTiO_4$, $CaRh_2O_4$, $CuRh_2O_4$, $ZnRh_2O_4$, and $CdRh_2O_4$.

55. The method of claim 43 wherein maintaining net partial oxidation reaction promoting conditions comprises a gas hourly space velocity in the range of 100,000 $hr^{-1}$ to 25,000,000 $hr^{-1}$.

56. The method of claim 43 wherein the superatmospheric pressure comprises a pressure in the range of about 200–32,000 kPa.

* * * * *